United States Patent [19]

Zeitler

[11] Patent Number: 4,502,656
[45] Date of Patent: Mar. 5, 1985

[54] NON-BINDING, QUICK DISCONNECT INSTRUMENT MOUNT ASSEMBLY

[75] Inventor: Richard J. Zeitler, Brookfield Center, Conn.

[73] Assignee: The Zei-Mark Corporation, Brookfield Center, Conn.

[21] Appl. No.: 464,123

[22] Filed: Feb. 4, 1983

[51] Int. Cl.³ .................................................. A47B 91/00
[52] U.S. Cl. ..................................... 248/346; 248/678
[58] Field of Search ............ 248/346, 544, 678, 222.4, 248/187, 310, 681, 680, 500

[56] References Cited

U.S. PATENT DOCUMENTS

| | | | |
|---|---|---|---|
| 3,429,543 | 2/1969 | Mooney | 248/346 |
| 3,908,942 | 9/1975 | Keith et al. | 248/346 |
| 4,027,841 | 6/1977 | Sturtevant et al. | 248/346 |
| 4,141,108 | 2/1979 | Busse | 248/222.4 |
| 4,275,939 | 6/1981 | Odermann | 248/544 |
| 4,368,867 | 1/1983 | Pendleton et al. | 248/346 |

Primary Examiner—William H. Schultz
Assistant Examiner—Ramon O. Ramirez
Attorney, Agent, or Firm—Mattern, Ware, Stoltz & Fressola

[57] ABSTRACT

A precision re-alignment instrument mount assembly for cameras, projectors optical instruments, and jigs and fixtures of all kinds is provided with a self-centering and non-binding quick connect and disconnect mechanism. A mounting plate secured to the instrument and a cooperating base plate are provided with juxtaposable mating surfaces, preferably flat, and a pair of dowel pins protruding from one plate are aligned to be seated in beveled, countersunk holes formed in the other plate, while a quick latch device anchors the two plates in aligned, mated juxtaposition.

7 Claims, 6 Drawing Figures

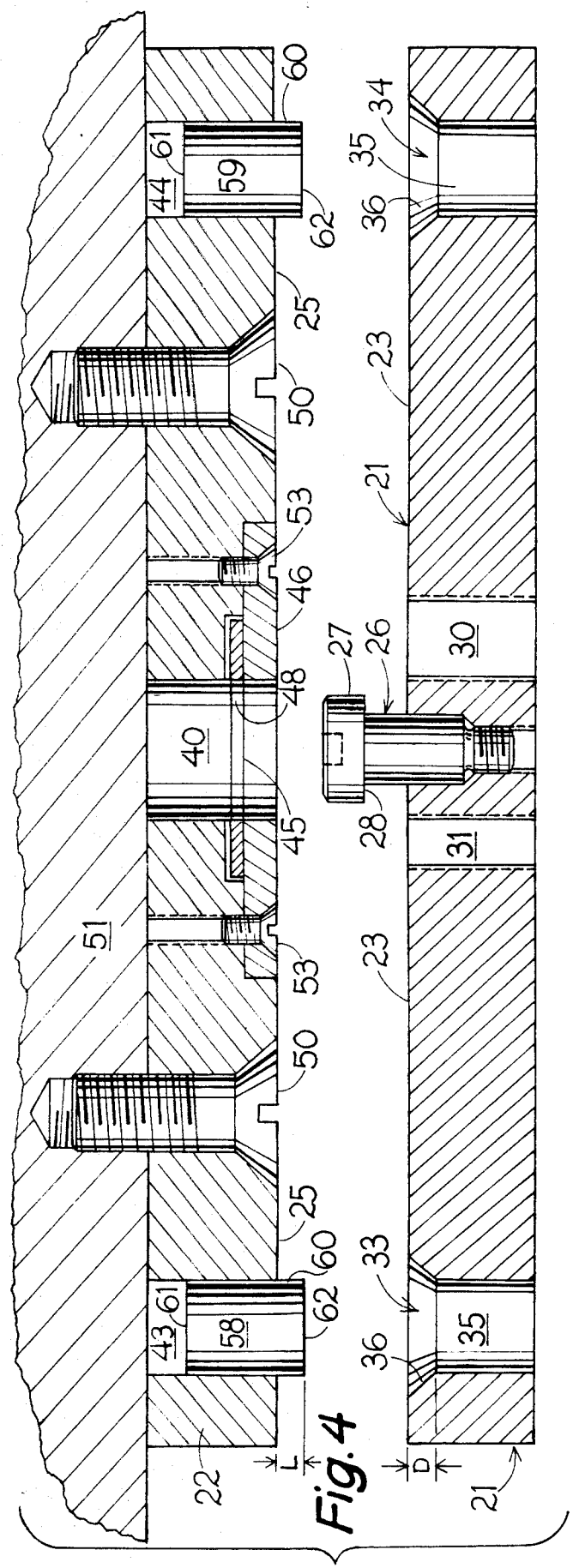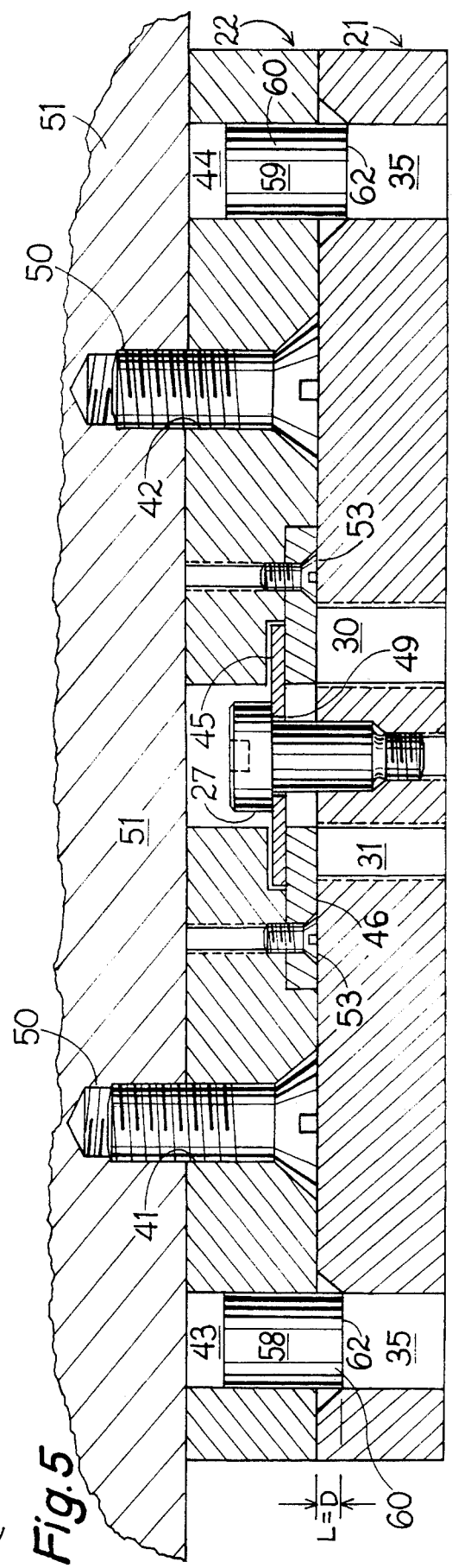

NON-BINDING, QUICK DISCONNECT INSTRUMENT MOUNT ASSEMBLY

TECHNICAL FIELD

This invention relates to quick disconnect instrument mount assemblies and more particularly to instrument mount assemblies which are automatically self-centering, precisely re-aligned and non-binding.

BACKGROUND ART

Although various constructions have been created to provide rapid repositioning of cooperating parts, a common problem has remained unsolved, until the present invention. In particular, these prior art repositioning and remounting constructions suffer from the common difficulty of binding engagement between the component parts.

Typically these repositioned systems are employed where apparatus which is to be removed, replaced or substituted for additional apparatus, on a repeated basis, must be repositioned in substantially the precise location. In order to achieve the desired accuracy, prior art systems employed interengagement between aligned dowel pins and mating holes. Although the accurate repositioning desired is substantially obtained, difficulty is typically encountered in removing the component parts, due to the binding engagement of the alignment dowel pins in their mating holes.

In most prior art structures, accurate repositioning constructions incorporate one or a plurality of dowel pins which are securely mounted in one component member of the repositioning system, while the second component of the repositioning system incorporates mating, precisely dimensioned dowel receiving bores. In order to achieve the desired accurate alignment of the two component members, the dowel pin is inserted into the bore, providing the desired repeatable repositioning of the system. However, once the dowel is mounted in the dowel receiving bore of the second component portion, accuracy is only maintained by assuring a close tolerance fit. This close tolerance fit, although achieving the desired accurate repositioning, also creates frictional engagement between the bore and the dowel, thereby preventing rapid disengagement of the component parts.

Therefore it is a principal object of the present invention to provide a self-centering instrument mount assembly which is capable of achieving precise, repeated aligned interengagement of the components thereof, while also providing rapid interconnection and disconnection thereof.

Another object of the present invention is to provide a self-centering instrument mount construction having the characteristic features defined above which is capable of being disconnected quickly and easily, without producing any binding or disengagement problems.

Another object of the present invention is to provide the self-centering instrument mount assembly having the characteristic features defined above, wherein the components are quickly and easily placed in securely locked interengagement.

Other and more specific objects will in part be obvious and will in part appear hereinafter.

SUMMARY OF THE INVENTION

The present invention achieves a self-aligning, self-centering, non-binding quick disconnect instrument mount assembly, which is typically employed for positioning and securely mounting any desired instrument, in various alternate positions or removing and replacing the instrument in the precise, original location. Typically, precise, accurate positioning for each instrument employed is mandatory, in order to assure and maintain the quality of the final product.

In the present invention, the self-aligning, self-centering, non-binding quick disconnect instrument mount assembly comprises a base plate which is securely affixed in a particular desired support, and a cooperating, interlocking, removable instrument support plate, which is repeatedly engageable and disengageable with the base plate.

In the present invention, the particular instrument is securely mounted to the instrument support plate which incorporates at least two dowel pins press fitted therein and extending therefrom. These dowel pins are constructed for cooperative interengagement with a pair of aligned, precisely dimensioned, countersunk holes which are formed in the base plate and incorporate a tapered countersunk portion and a precisely dimensioned cylindrical bore portion.

In addition, the instrument mount assembly incorporates an easily employed slide lock system to assure quick engagement and disengagement of the instrument support plate with the base plate. The slide lock system of this invention incorporates a slider member movably mounted to the instrument support plate and having a dual zone key-hole slot formed therein. The base plate incorporates a cooperating screw member secured thereto and having a head portion spaced above the base plate for locking engagement with the slider of the instrument mounting plate. By moving the slider between its two alternate positions, locked engagement and disengagement of the instrument mounting plate with the base plate is quickly and easily achieved.

In the instrument mount construction of the present invention, the desired precise alignment and self-centering is achieved by securely mounting each dowel pin in the instrument support plate with a portion of each pin extending therefrom a distance "L" equal to the perpendicular depth "D" of the countersunk portion of the pin receiving hole. In this way, the tapered, countersunk portion of the pin receiving hole will receive the dowel pin, regardless of any slight offset in its position, and automatically guide the terminating ends of the dowel pins to the top edge of the cylindrical bore portion of the hole. Consequently, the instrument mounting plate is automatically self-centered and aligned to the desired position, with each dowel pin having its central axis precisely coaxial with the central axis of its pin receiving hole. In this way, the instrument mounting plate is positioned in the precisely desired location, and then quickly locked in position by easily moving the slider of the instrument mounting plate from its open position to its interconnected, engaged position.

This invention accordingly comprises an article of manufacture possessing the features, properties, and relation of elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 4 is a cross-sectional front elevational view of the instrument mount assembly of the present invention shown with the components disconnected, in the process of being mounted in interengagement; and FIG. 5 is a cross-sectional front elevational view of the instrument mount assembly of the present invention shown in its locked, interengaged position.

BEST MODE FOR CARRYING OUT THE INVENTION

Figure 1:
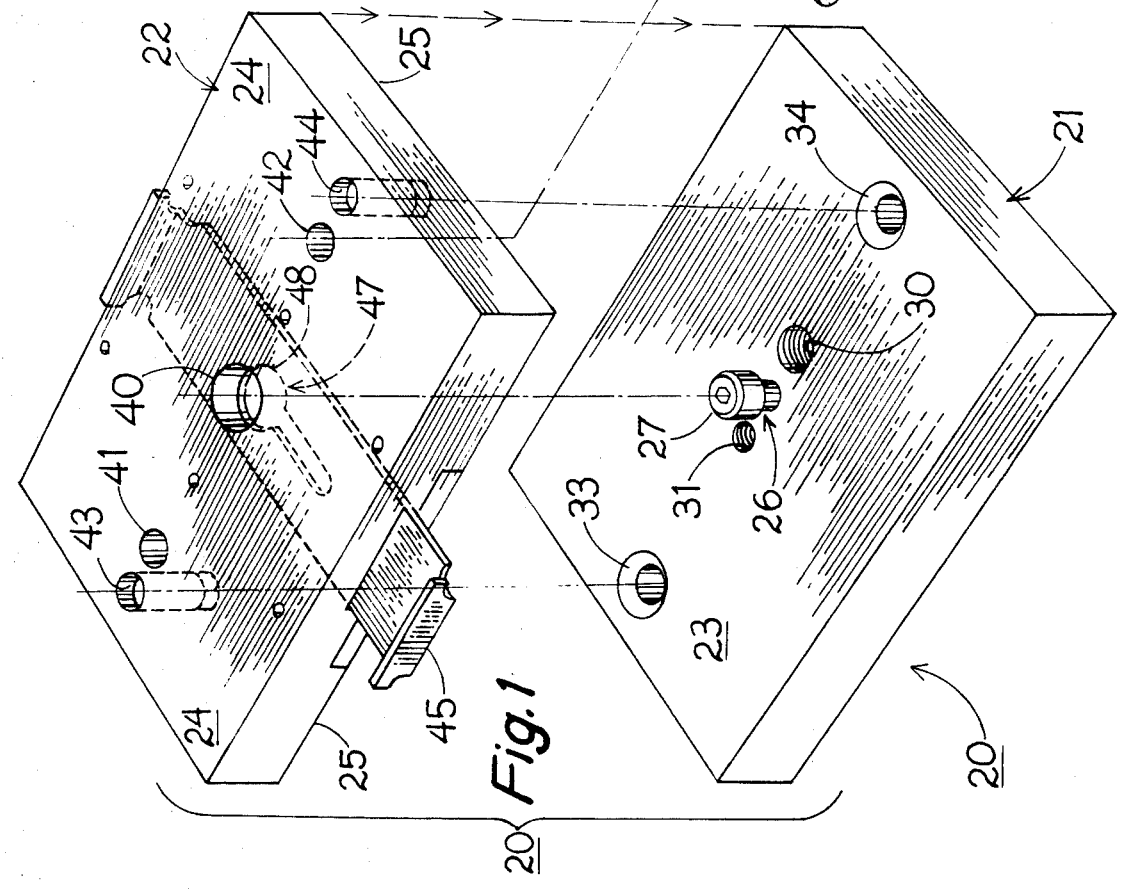
FIG. 1 is an exploded perspective view of the instrument mount assembly of the present invention depicted in its disengaged open configuration.

In FIG. 1, a self-centering, precision aligning and re-aligning, non-binding quick disconnect instrument mount assembly 20 of the present invention is shown incorporating a base plate 21 and an instrument mounting plate 22. Base plate 21 incorporates a top surface 23, while instrument mounting plate 22 incorporates a top surface 24 and a bottom surface 25. As is more fully disclosed below, bottom surface 25 of instrument mounting plate 22 is constructed for mating, contacting engagement and disengagement with top surface 23 of base plate 21.

Base plate 21 incorporates a shouldered screw member 26 having a head portion 27. Screw member 26 is securely threadedly engaged in base plate 21, with the base surface 28 of the head portion 27 spaced above top surface 23 of base plate 21.

In addition, base plate 21 incorporates threaded screw receiving holes 30 and 31 which are employed to securely mount base plate 21 in any desired location. Typically, base plate 21 is mounted to a counter, support surface, tripod, or other such secure mounting and supporting member.

Finally, base plate 21 incorporates two countersunk holes 33 and 34, each of which incorporates a substantially cylindrical bore portion 35 and an upper, tapered countersunk portion 36.

As best seen in FIGS. 1, 4 and 5, instrument mounting plate 22 incorporates a substantially centrally disposed large screw receiving hole 40, two smaller screw receiving holes 41 and 42, and two cooperating pin receiving holes 43 and 44. As shown in FIGS. 4 and 5, screw receiving holes 41 and 42 are designed for cooperative threaded engagement with screw means 50 employed to secure instrument mounting plate 22 to any desired instrument 51. In this way, instrument mounting plate 22 is quickly and easily affixed to any desired instrument 51 to allow instrument 51 to be quickly and easily securely engaged and disengaged from any desired base, as well as precisely aligned and re-aligned, regardless of the number of times instrument 51 is removed and replaced.

Instrument mounting plate 22 also incorporates a movable slider 45 which is capable of being moved between a first, base plate disconnected position and a second, base plate engaged position. Slider 45 is movably secured to instrument mounting plate 22 by a retaining plate 46 which is mounted to bottom surface 25 of mounting plate 22 by screw means 53. In the preferred embodiment as shown in FIGS. 4 and 5, bottom surface 25 of instrument mounting plate 22 incorporates a channel into which slider 45 and retaining plate 46 are positioned, to provide bottom surface 25 with a substantially planar flush configuration.

Figure 3:
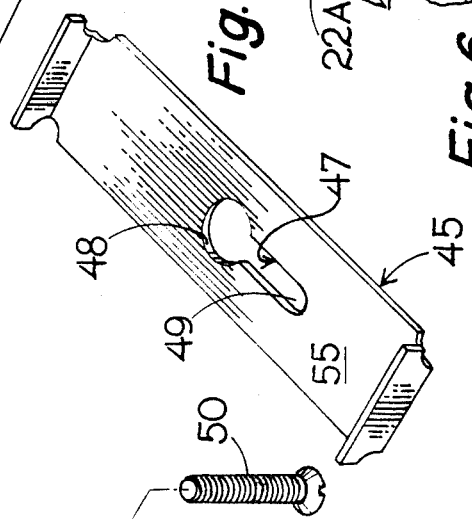
FIG. 3 is a perspective view of the interconnecting slider employed in the instrument mount assembly of the present invention.

As best seen in FIG. 3, slider 45 incorporates a key-hole slot 47, which incorporates an enlarged, substantially circular zone 48 and an elongated, narrow channel zone 49 which opens into circular zone 48. When slider 45 is mounted in position in instrument mounting plate 22, key-hole slot 47 is aligned with aperture 40.

Aperture 40 of mounting plate 22 and enlarged, substantially circular zone 48 of key-hole slot 47 comprise substantially identical diameters, with both of these diameters being greater than the diameter of head portion 27 of screw member 26. In this way, when enlarged zone 48 of key-hole slot 47 is positioned in axial alignment with aperture 40 of mounting plate 22, head portion 27 of screw member 26 is easily placed into aperture 40, as depicted in FIGS. 1 and 4.

Figure 2:
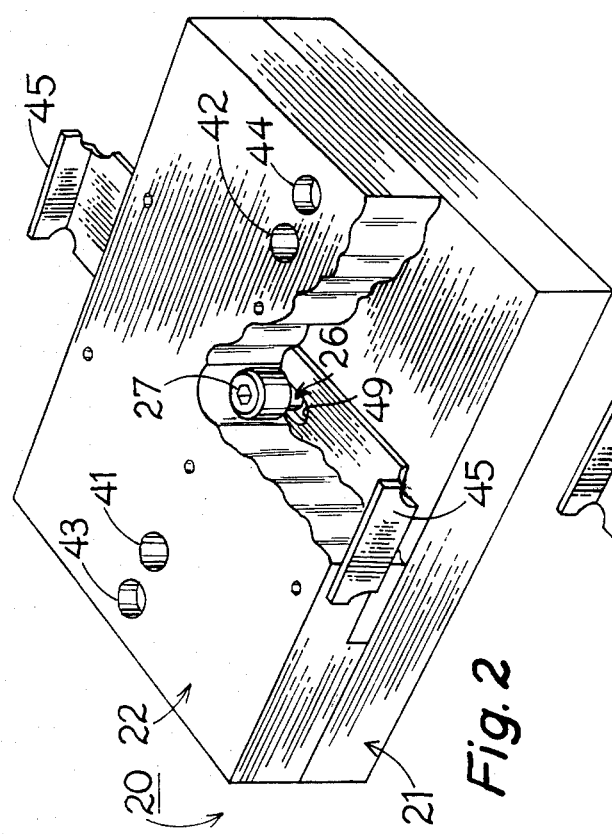
FIG. 2 is a perspective view partially broken away of the instrument mount assembly of the present invention shown in its locked, engaged position.

In order to achieve the desired rapid, easy, locked engagement of mounting plate 22 with base plate 21, slider 45 is moved into its first position shown in FIGS. 1 and 4, with enlarged zone 48 of slot 47 aligned with aperture 40. Then, head portion 27 of screw member 26 is inserted into aperture 40. Next, slider 45 is moved from its first position to its second position, shown in FIGS. 2 and 5, causing narrow, elongated, channel portion 49 of key-hole slot 47 to move into axial alignment with aperture 40. This movement simultaneously brings top surface 55 of slider 45 into engagement with the lower surface 28 of head portion 27 of screw member 46. As a result, surface 55 of slider 45 is in locked engagement with surface 28 of head portion 27 of screw member 26, and mounting plate 22 is therefore in locked engagement with base plate 21, as shown in FIGS. 2 and 5.

As is readily apparent from the preceding description, whenever instrument 51 needs to be removed from its securely mounted position, slider 45 is merely moved from its locked position to its open position, thereby releasing the engagement of slider 45 with screw member 26, allowing instrument 51 and mounting plate 22 to be quickly and easily lifted away from base plate 21.

In addition to providing this easily employed, quick disconnect instrument mount assembly, the present invention also achieves a self-centering, precision aligning and re-aligning instrument mount assembly. As discussed above, prior art structures are not able to be quickly and easily disengaged, due to the binding effect of the conventional alignment pins in their pin receiving holes. In the present invention, these prior art problems are totally eliminated, and a non-binding, easily removable construction is achieved which also assures precision alignment and re-alignment, whenever desired.

In the present invention, precision aligning and re-aligning is achieved by a uniquely constructed, cooperating dowel pin and pin receiving hole configuration. As best seen in FIGS. 4 and 5, dowel pins 58 and 59 are preferably securely mounted to plate 22 by a press fit engagement in the holes 43 and 44, with a portion of dowel pins 58 and 59 extending below surface 25 of mounting plate 22.

Dowel pins 58 and 59 each incorporate a substantially cylindrical outer peripheral surface 60, a substantially flat upper surface 61 and a substantially flat lower surface 62. In addition, outer peripheral surface 60 joins lower surface 62 at a substantially bevel-free right angle. Although dowel pins 58 and 59 should have all burrs removed from the edges thereof, the preferred construction of the present invention incorporates dowel pins 58 and 59 with substantially sharp, right angular rim edges between bottom surface 62 and outer peripheral surface 60.

In order to achieve the desired self-centering and precision aligning and re-aligning, without incurring any unwanted binding, dowel pin 58 is constructed for mating aligned non-binding engagement with countersunk hole 33, while dowel pin 59 is constructed for mating, aligned, non-binding engagement with countersunk hole 34. As best seen in FIG. 4, countersunk holes 33 and 34 are both formed in upper surface 23 of base plate 21 with an entry portal defined by the tapered countersunk portion 36. As discussed above, tapered countersunk portion 36 terminates at the substantially cylindrical bore portion 35 which is coaxially aligned with tapered, countersunk portion 36.

In the preferred embodiment, the present invention achieves the unique self-centering, precision aligning, non-binding, quick disconnect instrument mount assembly by constructing the diameter of central bore portion 35 to be substantially identical to, or slightly greater than, the outside diameter of cylindrical pin surface 60. In addition, dowel pins 58 and 59 extend perpendicularly below lower surface 25 of mounting plate 22 a distance which is substantially identical to the axial depth of tapered countersunk portion 36 of holes 33 and 34. By employing this construction, instrument mounting plate 22 is automatically self-centered and aligned in the desired precise position each and every time instrument mounting plate 22 is fully engaged with base plate 21. By referring to the following detailed discussion in conjunction with FIGS. 4 and 5, the self-centering, precisely aligning, non-binding, secure engagement of instrument mounting plate 22 with base plate 21 is best understood.

Initially, instrument mounting plate 22 is positioned in cooperative relationship with base plate 21, with head portion 27 of screw means 26 substantially axially aligned with aperture 40 of mounting plate 22. However, since the diameter of aperture 40 is greater than the diameter of head portion 27 of screw means 26, the desired aligned position is not repeatedly obtained, with precise accuracy, by merely aligning screw means 26 with aperture 40. In order to achieve the desired, repeatable, precision accuracy, dowel pins 58 and 59 are employed in cooperation with countersunk holes 33 and 34.

As instrument mounting plate 22 is advanced downward into engagement with base plate 21, dowel pin 58 enters countersunk hole 33, while dowel pin 59 simultaneously enters countersunk hole 34. If plate 22 is shifted slightly laterally from the desired position, the terminating rim edges between peripheral surface 60 and lower surface 62 of dowel pins 58 and 59 contact the tapered countersunk portions 36 of holes 33 and 34.

As mounting plate 22 is advanced further toward base plate 21, the edges of dowel pins 58 and 59 simultaneously slide downwardly along tapered countersunk portion 36 of holes 33 and 34, until surface 25 of mounting plate 22 contacts surface 23 of base plate 21. Once this final position is reached, dowel pins 58 and 59 are engaged with countersunk holes 33 and 34, with the rim edges thereof which are formed by cylindrical surfaces 60 and lower surfaces 62 located precisely at the top edge of cylindrical bore portion 35 of countersunk holes 33 and 34. This repeatable precision alignment is assured by controlling the axial depth "D" of countersunk portions 36 of holes 33 and 34 to be substantially identical to the exposed length "L" of dowel pins 58 and 59, while also controlling the diameter of bore portion 35 to be substantially identical to, or slightly greater than, the diameter of dowel pins 58 and 59.

When in the final seated position shown in FIG. 5, the central axis of dowel pin 58 is precisely, coaxially aligned with the central axis of cylindrical bore portion 35 of countersunk hole 33, while the central axis of dowel pin 59 is precisely coaxially, aligned with the central axis of bore portion 35 of countersunk hole 34. In this way, instrument mounting plate 22 is quickly and easily placed in the desired precisely aligned position, each and every time plate 22 is mounted to base plate 21.

Another important feature of the present invention is the complete elimination of unwanted binding. This undesirable binding is eliminated by constructing dowel pins 58 and 59 to extend from surface 25 of mounting plate 22 a distance "L" substantially identical to the axial depth "D" of tapered countersunk portion 36 of countersunk holes 33 and 34. As a result of this construction, dowel pin 58 does not enter the cylindrical bore portion 35 of countersunk hole 33, while dowel pin 59 does not enter the cylindrical bore portion 35 of countersunk hole 34. In this way, binding of the dowel pin in its receiving hole is completely avoided. However, precise alignment is attained repeatedly and consistently, since dowel pins 58 and 59 are brought into the precisely identical aligned, cooperating engagement with the entry zone of cylindrical bore portion 35, without ever extending into cylindrical bore portion 35.

Figure 6:
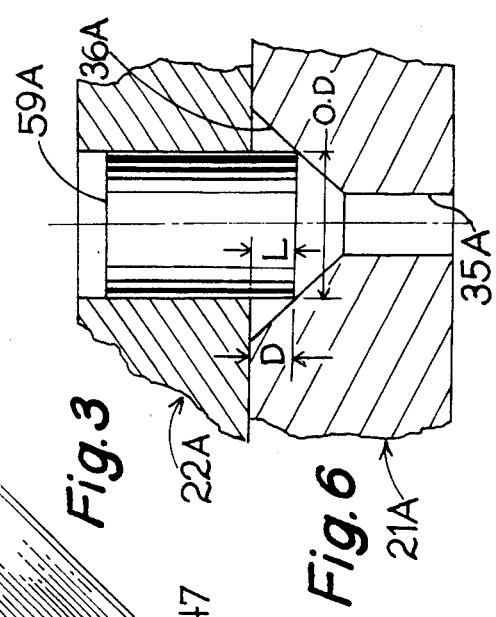
FIG. 6 is a fragmentary cross-sectional front elevation view of a portion of a modified embodiment of the invention.

A modified embodiment of the quick disconnect assemblies of the invention incorporating a different dowel pin and countersunk seat feature is shown schematically in FIG. 6, where dowel pin 59A again protrudes below instrument plate 22A by length "L", with its lower rim edge seating on the tapered, countersunk portal 36A of an alignment hole 35A smaller in diameter than dowel pin 59A. The depth of countersunk surface 36A is selected to produce seating depth "D" at a point where the diameter of the conical countersunk surface 36A corresponds to the outside diameter of the dowel pin 59A, and the central axes of dowel pin 59A is substantially co-axially aligned with the central axis of countersunk portal 36A.

It will thus be seen that the objects set forth above, among those made apparent from the preceding description, are efficiently attained and, since certain changes may be made in the above article without departing from the scope of the invention, it is intended that all matter contained in the above description as shown in the accompanying drawings shall be interpreted as illustrative and not in a limiting sense.

It is also to be understood that the following claims are intended to cover all of the generic and specific features of the invention herein described and all statements of the scope of the invention in which, as a matter of language, might be said to fall therebetween.

Having described my invention, what I claim as new and desire to secure by Letters Patent is:

1. A non-binding, quick disconnect instrument mount assembly comprising
   A. a base plate securely mountable to a desired support member and incorporating at least two beveled, countersunk pin receiving holes formed in one surface thereof, each of said pin receiving holes comprising
      1. a tapered, countersunk portion defining the hole entry zone, and
      2. a substantially cylindrical bore portion joining with and extending from the bottom of the countersunk portion; and
   B. a mounting plate adapted for secure mounted engagement with any desired instrument and incorporating at least two dowel pins, each
      1. being securely mounted to the mounting plate and positioned for cooperative engagement with a pin receiving hole,
      2. extending from the mounting plate a perpendicular distance which is substantially identical to the perpendicular depth of the countersunk portion of the cooperating pin receiving hole, and
      3. comprising a diameter which is substantially equal to the diameter of the cylindrical bore portion of the cooperating pin receiving hole, whereby an easily engaged instrument mount assembly is achieved which automatically centers and precisely aligns the instrument mounting plate with the base plate, each and every time, while preventing binding engagement therebetween.

2. The non-binding, quick disconnect instrument mount assembly defined in claim 1, wherein each of the dowel pins is further defined as comprising
   4. a substantially cylindrical shape, with the exposed portion thereof, terminating in a substantially flat surface forming a substantially 90° edge with the cylindrical outer peripheral surface, and
   5. having a diameter equal to, or slightly less than, the diameter of the cylindrical bore portion of its cooperating pin receiving hole.

3. The non-binding quick disconnect instrument mount assembly defined in claim 1, further comprising
   C. locking means for securely engaging the mounting plate with the base plate.

4. A non-binding, quick disconnect instrument mount assembly comprising
   A. a base plate securely mountable to a desired support member and incorporating
      1. at least two beveled countersunk pin receiving holes formed in one surface thereof, each of said pin receiving holes comprising
         a. a tapered, countersunk portion defining a hole entry zone, and
         b. a substantially cylindrical bore portion joining with and extending from the bottom of the countersunk portion, and
      2. a screw member
         a. threadedly engaged with the base plate and extending therefrom, and
         b. incorporating a screw head portion spaced above the surface of the ase plate in which the pin receiving holes are formed; and
   B. a mounting plate adapted for secure mounted engagement with any desired instrument and incorporating
      1. at least two dowel pins, each
         a. securely mounted to the mounting plate and positioned for cooperative engagement with a pin receiving hole,
         b. extending from the mounting plate by a perpendicular distance which is substantially identical to the perpendicular depth of the countersunk portion of the cooperating pin receiving hole, and
         c. comprising a diameter which is substantially equal to the diameter of the cylindrical bore portion of the cooperating pin receiving hole,
      2. a movable latch member slidably secured to the mounting plate and incorporating a key-hole slot formed therein, defined by
         a. an enlarged screw head receiving zone, and
         b. an elongated, narrow screw head locking channel which opens into the enlarged zone at one end thereof; and
      3. an enlarged aperture formed therein and positioned for aligned cooperation with the key-hole slot, whereby the latch member is movable from a first position, wherein the enlarged zone of the key-hole slot is aligned with the aperture of the mounting plate for receiving the screw member of the base plate, and then quickly and easily moved into its second position, with the key-hole slot engaging and interlocking with the underside of the screw head of the screw member, providing the desired interengagement of the instrument mounting plate with the base plate.

5. The quick disconnect, instrument mount assembly defined in claim 4, wherein the mating engaging surfaces of the base plate and the instrument mounting plate both comprise substantially flat surfaces.

6. The quick disconnect instrument mount assembly defined in claim 5, wherein the dowel pins are further defined as being mounted to the instrument mount plate substantially perpendicularly to the surface thereof from which they extend, and the pin receiving holes are further defined as being formed in the base plate with their central axes substantially perpendicular to the surface thereof.

7. A non-binding, quick disconnect instrument mount assembly comprising
   A. a base plate securely mountable to a desired support member and incorporating at least two beveled, countersunk pin receiving holes formed in one surface thereof, each of said pin receiving holes comprising a tapered, countersunk portion defining the hole entry zone; and
   B. a mounting plate adapted for secure mounted engagement with any desired instrument and incorporating at least two dowel pins, each
      1. being securely mounted to the mounting plate and positioned for cooperative engagement with a pin receiving hole, and
      2. extending from the mounting plate a perpendicular distance which is less than the perpendicular depth of the countersunk portion of the cooperating pin receiving hole while also contacting the beveled surface of the corresponding countersunk pin receiving hole substantially simultaneously with the abutting engagement of the surfaces of the mounting plate and the base plate, whereby an easily engaged instrument mount assembly is achieved which automatically centers and precisely aligns the instrument mounting plate with the base plate, each and every time, while preventing binding engagement therebetween.

* * * * *